US011293590B2

(12) United States Patent
Li et al.

(10) Patent No.: US 11,293,590 B2
(45) Date of Patent: Apr. 5, 2022

(54) OIL FLOW SWITCH AND LUBRICATION SYSTEM WITH THE SAME FOR A REFRIGERATION SYSTEM

(71) Applicants: Johnson Controls Air Conditioning and Refrigeration (Wuxi) Co., Ltd., Wuxi (CN); York (Wuxi) Air Conditioning and Refrigeration Co., Ltd., Wuxi (CN); Johnson Controls Technology Company, Auburn Hills, MI (US)

(72) Inventors: Jing Li, New Freedom, PA (US); Tianlong Xiao, Wuxi (CN); Jinliang Li, Wuxi (CN)

(73) Assignees: Johnson Controls Air Conditioning and Refrigeration (Wuxi) Co., Ltd., Wuxi New District (CN); York (Wuxi) Air Conditioning and Refrigeration Co., Ltd., Wuxi New District (CN); Johnson Controls Tyco IP Holdings LLP, Milwaukee, WI (US)

(*) Notice: Subject to any disclaimer, the term of this patent is extended or adjusted under 35 U.S.C. 154(b) by 443 days.

(21) Appl. No.: 16/325,685

(22) PCT Filed: Aug. 16, 2017

(86) PCT No.: PCT/US2017/047219
§ 371 (c)(1),
(2) Date: Feb. 14, 2019

(87) PCT Pub. No.: WO2018/035265
PCT Pub. Date: Feb. 22, 2018

(65) Prior Publication Data
US 2019/0203882 A1 Jul. 4, 2019

(30) Foreign Application Priority Data

Aug. 17, 2016 (CN) .......................... 201610688055.5
Aug. 17, 2016 (CN) .......................... 201620903382.3

(51) Int. Cl.
*F25B 31/00* (2006.01)
*F16N 29/00* (2006.01)
(Continued)

(52) U.S. Cl.
CPC .............. *F16N 23/00* (2013.01); *F16N 7/40* (2013.01); *F16N 29/00* (2013.01); *F25B 31/002* (2013.01);
(Continued)

(58) Field of Classification Search
CPC .. F25B 31/002; F25B 2700/03; F25B 31/004; F25J 5/00; F16N 23/00; F16N 29/00; F16N 2250/18
See application file for complete search history.

(56) References Cited

U.S. PATENT DOCUMENTS 2,246,244 A * 6/1941 Consleyjohnc ......... F25B 31/00
62/192
4,428,208 A * 1/1984 Krause .................... F16K 31/18
137/426
(Continued)

FOREIGN PATENT DOCUMENTS

DE 4220642 A1 9/1993

OTHER PUBLICATIONS

International Search Report and Written Opinion for PCT Application No. PCT/US2017/047219 dated Oct. 25, 2017, 12 pgs.

*Primary Examiner* — Michael R Mansen
*Assistant Examiner* — Mark K Buse
(74) *Attorney, Agent, or Firm* — Fletcher Yoder, P.C.

(57) ABSTRACT

The present disclosure relates to an oil flow switch, comprising a float device connected to a circulating oil passage and a floating liquid level switch element provided in the float device, wherein the float device comprises an oil inlet, an oil outlet, and a float chamber provided between the oil inlet and the oil outlet, the floating liquid level switch element is provided in the float chamber, and the float device is provided with a channel in communication with the float chamber. The oil flow switch according to the present disclosure may avoid a false alarm of the oil level switch and meanwhile mitigate disturbance to the float caused by liquid level fluctuation to reduce friction between the float and the sleeve rod. Further, a lubrication system with the above oil.

18 Claims, 5 Drawing Sheets

(51) Int. Cl.
  *F16N 23/00* (2006.01)
  *F16N 7/40* (2006.01)
  *F25B 43/00* (2006.01)

(52) U.S. Cl.
  CPC .......... *F25B 31/004* (2013.01); *F25B 43/003* (2013.01); *F16N 2210/10* (2013.01); *F16N 2250/18* (2013.01); *F16N 2280/00* (2013.01); *F25B 2500/16* (2013.01); *F25B 2700/03* (2013.01)

(56) References Cited

U.S. PATENT DOCUMENTS

| | | | | |
|---|---|---|---|---|
| 4,533,802 | A * | 8/1985 | Spalding | H01H 35/405 200/81.9 M |
| 5,068,503 | A * | 11/1991 | Sladky | H01H 35/34 200/83 L |
| 5,327,997 | A * | 7/1994 | Nash, Jr | F04B 39/0207 184/103.2 |
| 5,542,499 | A * | 8/1996 | Westermeyer | F16N 19/006 184/103.2 |
| 5,901,559 | A * | 5/1999 | Westermeyer | F17C 13/021 62/84 |
| 6,125,642 | A * | 10/2000 | Seener | F04C 18/0215 184/103.1 |
| 6,263,694 | B1 * | 7/2001 | Boyko | F25B 31/004 62/195 |

* cited by examiner

OIL FLOW SWITCH AND LUBRICATION SYSTEM WITH THE SAME FOR A REFRIGERATION SYSTEM

FIELD OF THE INVENTION

The present disclosure generally relates to an oil lubrication technology, and more particularly to an oil flow switch and a lubrication system with the same for a refrigeration system.

BACKGROUND OF THE INVENTION

In a refrigeration system, refrigerant oil functions to lubricate, seal, and reduce noise, etc.; therefore, early warning about an oil level of lubricant is critical to ensure system reliability. A float level switch or a photoelectric level switch is commonly employed in current approaches for determining whether the oil level is lower than a predetermined oil level. Specifically, the float level switch is a mechanical liquid level switch in which a float will float under the buoyancy force in the liquid, and will sink once the liquid level is insufficient during which the magnetic field of a magnet built in the float will change, which consequently changes a state of a contact in a reed switch, i.e., changing from a previous off state to an on state, or vice versa, thereby signaling that the liquid level is lower than the predetermined oil level. The photoelectric liquid level switch is an electronic liquid level switch, and works following optical principles and electronic technologies, in which light emitted from a light-emitting diode will be refracted back by a prism in the presence of oil so that an electronic sensing part can receive the refracted light, i.e., indicating a normal oil level; once the oil level is lower than the prism, the light will be scattered in an oil sink and cannot be refracted back so that it may be sensed whether the oil level is normal or not. During use, once the liquid level in the oil sink or oil tank is lower than a liquid level of a amount of reserved oil, the liquid level switch will emit a low-oil-level signal; upon receiving the signal from the level switch, a controller will stop an equipment from running to protect the equipment from possible running with insufficient oil.

During use, it is found that both of the float level switch and the photoelectric level switch have a drawback: once bubbles exist in the liquid, neither of the switches can accurately sense whether the liquid level is proper. In a refrigeration system, a certain percentage of refrigerant is always dissolved in an oil solution such that upon a change of temperature or pressure, the refrigerant dissolved in the oil solution will possibly be evaporated with bubbles. This will cause a decrease in the density of the oil solution and a failure of the float of the float level switch to float, and consequently the level switch will emit a false level signal. Likewise, for the photoelectric liquid level switch, due to the effervescent oil solution, the light emitted from the photoelectric liquid level switch cannot be successfully refracted back from the prism to the photoelectric switch, which will also cause a false alarm.

SUMMARY OF THE INVENTION

One of the objectives of the present disclosure is to at least partially solve the above problems in the prior art by providing an oil flow switch and a lubrication system with the same for a refrigeration system.

According to an aspect of the present disclosure, there is provided an oil flow switch, comprising a float device connected to a circulating oil passage and a floating liquid level switch element provided in the float device, wherein the float device comprises an oil inlet, an oil outlet and a float chamber provided between the oil inlet and the oil outlet, the floating liquid level switch element is provided in the float chamber, and the float device is provided with a channel in communication with the float chamber.

According to the present disclosure, the oil flow switch may be provided on the circulating oil passage of a compressor. When oil flows through the oil flow switch, the float chamber will be filled with oil liquid. The float will overcome its own gravity and rise under a buoyancy force, and at this point, the oil flow switch is turned on. Meanwhile, once there is no oil passing through the oil passage, the oil in the float chamber will return to an oil pipe under the action of its gravity. At this point, the buoyancy force is lost gradually, and finally, the float falls back to a lower-limit position, and the oil flow switch is turned off. It is knowable that as long as oil flows in the circulating oil passage, the float chamber will be filled with oil liquid, and thus the oil flow switch will not be off. In this way, false alarms caused by various reasons may be effectively prevented.

Optionally, an oil flow hole may be provided at a bottom of the oil inlet of the float device to make the float chamber filled with oil by means of an impulse of the oil flow or a local pressure drop caused by a change of flow direction of the oil flow.

Optionally, a channel for discharging gas in the float chamber may be disposed between the float chamber and the oil outlet.

Optionally, the floating liquid level switch element may further comprise a float switch base fixedly provided in the float chamber and a float movable relative to the float switch base with the rise and fall of a liquid level in the float chamber.

Optionally, the float switch base may be fixedly threaded in the float chamber, and the float switch base may be further provided with a sleeve rod on which the float is strung.

Optionally, the float chamber may also be provided with a sight glass for observing a liquid level and a working state of the float.

Optionally, the float switch base may be provided with a reed switch which is triggered by the float and generates a digital signal transmitted outwards via a signal line on the float switch base.

Optionally, the float chamber and the float device may be integrally formed into a single piece.

According to another aspect of the disclosure, a lubrication system for a refrigeration system is disclosed, wherein the lubrication system may comprise a compressor, an oil storage device, an oil flow switch, a filter, and a circulating oil pump, all of which may be connected through a circulation pipeline, the oil flow switch may be provided downstream of the oil storage device, an oil inlet of the oil flow switch may be in communication with an oil outlet of the oil storage device, and the circulating oil pump is configured for pumping filtered lubricant back into the compressor, characterized in that the oil flow switch is an oil flow switch according to the present disclosure.

BRIEF DESCRIPTION OF THE DRAWINGS

The above and other aspects of the present disclosure will become more apparent and comprehensible through the descriptions of illustrative embodiments of the present disclosure with reference to the accompanying drawings, in which.

Figure 1:
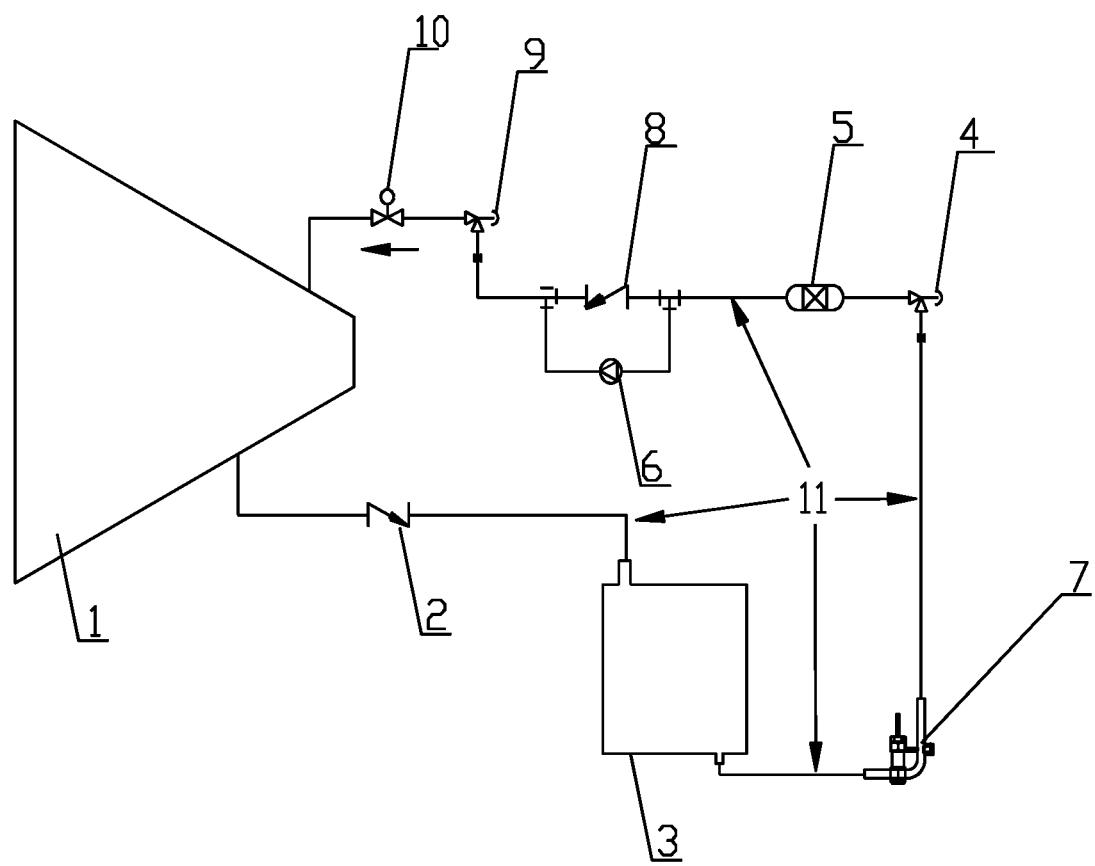
FIG. 1 schematically illustrates a general layout of a refrigeration system according to the present disclosure.

EXPLANATIONS OF REFERENCE NUMERALS 1. compressor 2, 8. one-way valve 3. oil storage tank 5. filter 4, 9. angle valve 6. oil pump 7. float device 10. oil supply electromagnetic valve 7-1. oil inlet 7-2. oil outlet 7-3. channel 7-4. float switch base 7-5. sight glass 7-6. float 7-7. oil flow hole

DETAILED DESCRIPTION OF THE EMBODIMENTS

Hereinafter, the preferred embodiments of the present disclosure will be described with reference to the accompanying drawings. It needs to be noted that the terms "upper," "lower," "front," "rear," "left," "right," and similar expressions used herein are only for illustration purposes, not intended for limiting.

Figure 2:
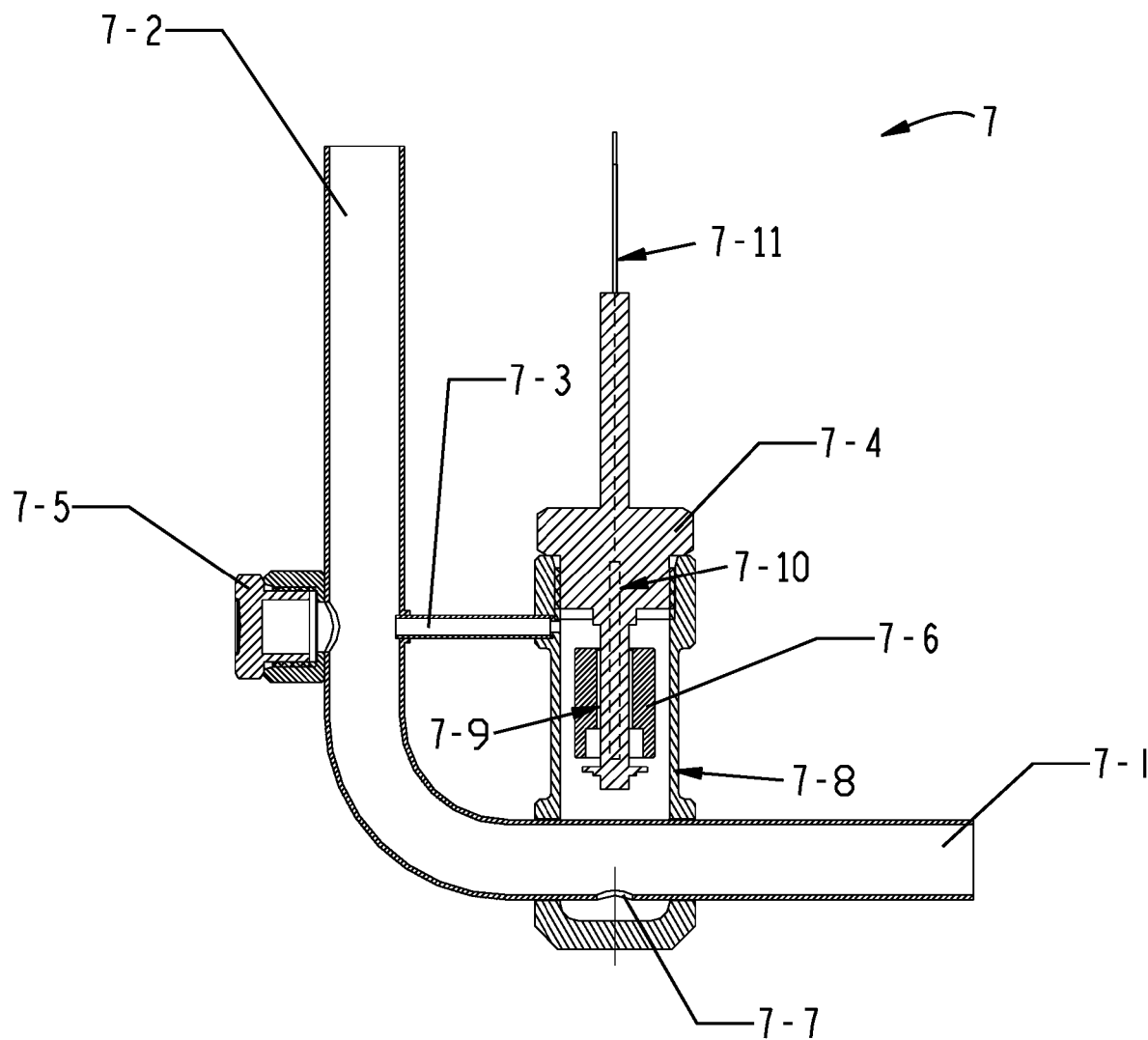
FIG. 2 schematically illustrates an embodiment of an oil flow switch connected to an oil passage.

FIGS. 1-2 illustrate a refrigeration system according to the present disclosure, wherein the refrigeration system may comprise a compressor 1 configured to compress a refrigerant for refrigeration circulation, wherein lubricant in the compressor 1, after being separated in an oil separator of the compressor 1, is guided to an oil storage tank 3 via a first portion of the pipeline 11 and a one-way valve 2, and then is in communication with an oil inlet 7-1 of the float device 7 (also referred to herein as an "oil flow switch") via a second portion of the pipeline 11. Further, the lubricant flows out of an oil outlet 7-2 of the float device 7 into an angle valve 4, and after being filtered by a filter 5, is guided into a one-way valve 8 or an oil pump 6 so that the filtered lubricant returns into the compressor 1 via an oil supply electromagnetic valve 10, thereby forming a circulating lubrication system (also referred to herein as a "lubrication circuit") of the refrigeration system. The pipeline 11 of the circulating lubrication system may also be referred to herein as a "circulating oil passage" of the lubrication system.

During actual use, an oil level in the oil storage tank 3 needs to be monitored to ensure enough lubricant to be fed into the compressor 1. According to the present disclosure, monitoring the oil level in the oil storage tank 3 may be implemented by a float device 7 connected to a lubricant passage. As illustrated in FIG. 2, the float device 7 may have an oil inlet 7-1 connected to an oil outlet pipe of the oil storage tank 3 and an oil outlet 7-2 connected to an oil inlet pipe of the angle valve 4. The float device 7 may comprise a float chamber 7-8 disposed on the pipeline and a float switch base 7-4 fixedly threaded to the float chamber 7-8. Particularly, the float switch base 7-4 may be integrally formed with a sleeve rod 7-9, and the float 7-6 also referred to herein as a "float ball") may be strung on the sleeve rod 7-9 to float up and down along the sleeve rod in the float chamber with respect to a liquid level state in the oil storage tank 3. Preferably, a reed switch 7-10 triggered by the float may be provided on the float switch base 7-4. A digital signal generated by the reed switch 7-10 may be transmitted outward via a signal line 7-11 on the float switch base 7-4.

Meanwhile, due to the lubricant, friction between the float 7-6 and the sleeve rod 7-9 may also be reduced. A sight glass may be provided in the float chamber 7-8 to observe a liquid level and a working state of the float. Preferably, a small-diameter channel 7-3 may be provided between the float chamber 7-8 and the oil outlet 7-2. Due to a pressure difference existing between the inlet 7-1 and the outlet 7-2, under the action of the channel 7-3, gas in the top of the float chamber 7-8 will be discharged so that the float chamber 7-8 may be filled with liquid as much as possible. An oil flow hole 7-7 may be provided at a bottom of the oil inlet pipe of the float device 7 so that after the lubricant enters from the oil inlet 7-1, the float chamber 7-8 will be filled with lubricant due to an impulse of the oil flow or a local pressure drop generated by an elbow, and meanwhile such a structure will make the float switch base 7-4 shorter to provide a better stability.

Figure 5:
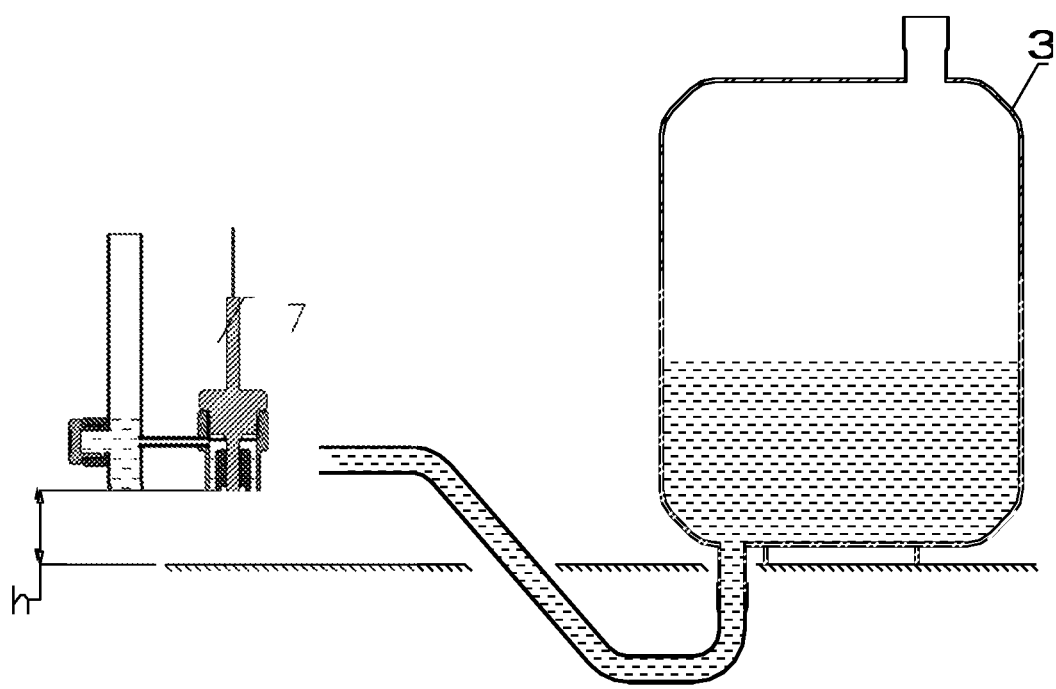
FIG. 5 schematically illustrates an oil flow switch connected to an oil storage tank.

Referring to FIG. 5, FIG. 5 illustrates a float device 7 connected to an oil storage tank 3. As illustrated in the figure, a mounting height h of the float device 7 may be adjusted as needed, mainly depending on the amount of the reserved lubricant in the oil storage tank 3. For different models of compressors, the amount of the reserved lubricant may be different, depending on applications in different systems. Therefore, a height position where the float is closed may be allowed to be flush with a reserved liquid surface of the lubricant in the oil tank 3 by adjusting the mounting height h of the float device 7. Particularly, the reserved liquid surface of the lubricant refers to a minimum amount of lubricant that may still guarantee a normal start of the compressor and recovery of the lubricant into the oil storage tank 3 when a low-oil-level warning presents.

During operation, the lubricant discharged from the compressor 1 flows in a circulating oil passage under the action of the oil pump 6. When the lubricant from the oil storage tank 3 flows through the float device 7, the float chamber will be filled with the lubricant such that the float 7-6 can overcome the gravity to rise under the action of buoyancy force to keep the oil flow switch always in an on state. Once there is no oil passing through the oil pipe, the oil in the float chamber will return to the oil pipe under the action of its own gravity. At this point, the buoyancy force of the float 7-6 will be gradually lost, and finally the float 7-6 will fall to a lower limit position where the oil flow switch becomes off. It is knowable that with the oil flow switch according to the present disclosure, as long as oil is flowing in the lubricant passage, the float chamber will be filled with the oil liquid, and thus an off state of the oil flow switch will not occur so that a false alarm caused by various reasons may be effectively prevented.

Figure 3:
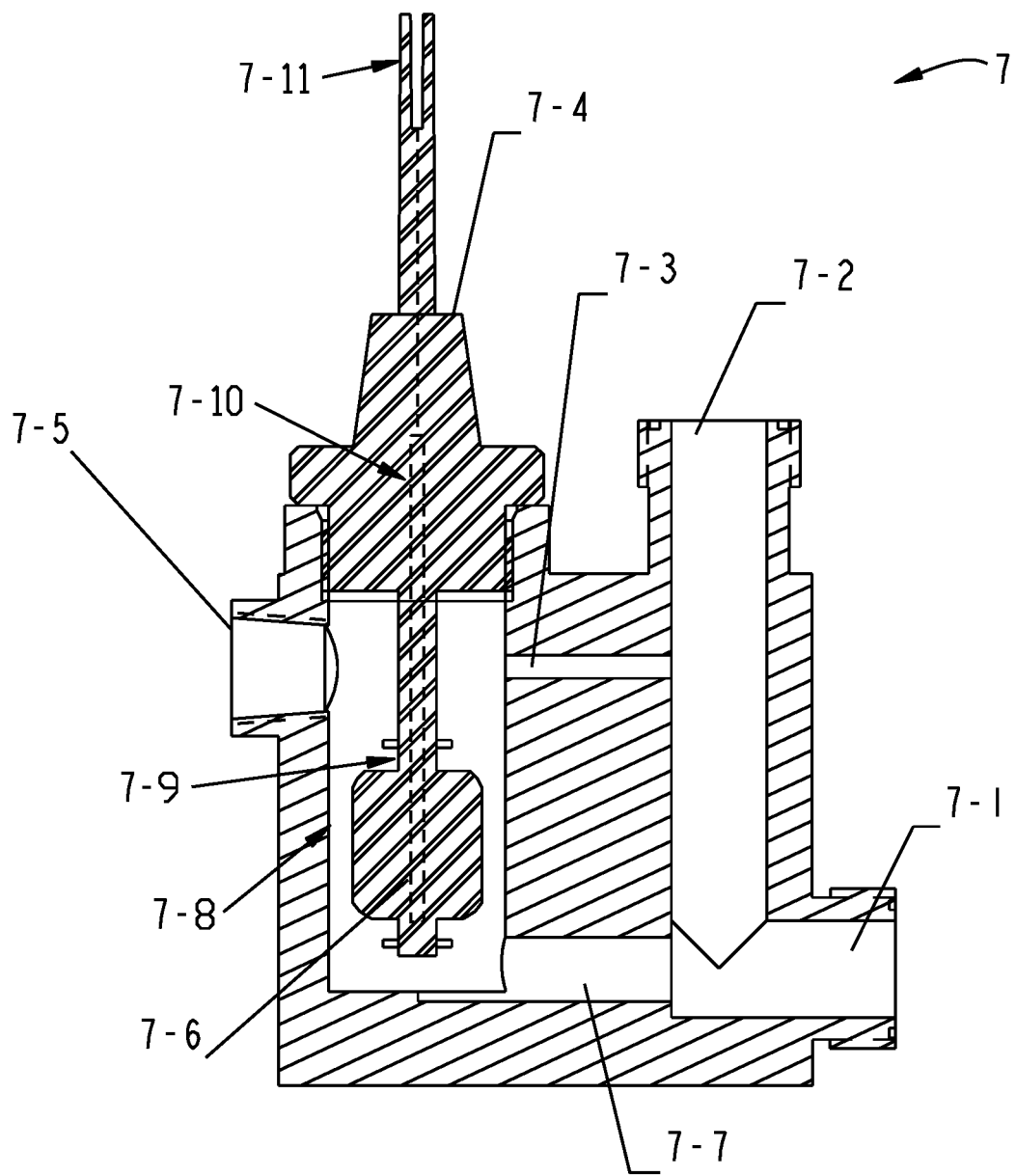
FIG. 3 schematically illustrates another embodiment of the oil flow switch.

FIG. 3 illustrates another embodiment of an oil flow switch 7 according to the present disclosure. Particularly, the float chamber 7-8 and other portions of the float device 7 may be integrally formed into a single piece, wherein the float chamber 7-8 is disposed on the oil pipeline side of the float device, and communicated with the oil inlet 7-1 of the oil pipeline via the oil flow hole 7-7. The float switch base 7-4 may be fixedly mounted to the float chamber 7-8 for example through a threaded connection, and a sight glass 7-5 for observing a liquid level may be provided on one side of the float chamber 7-8. The float chamber 7-8 and the oil outlet 7-2 of the oil pipeline may be connected via the channel 7-3 such that the gas in the float chamber can be discharged. According to a preferred embodiment of the present disclosure, integration of the components may be realized so that the float device 7 can be easily fitted into the circulating oil passage.

Figure 4:
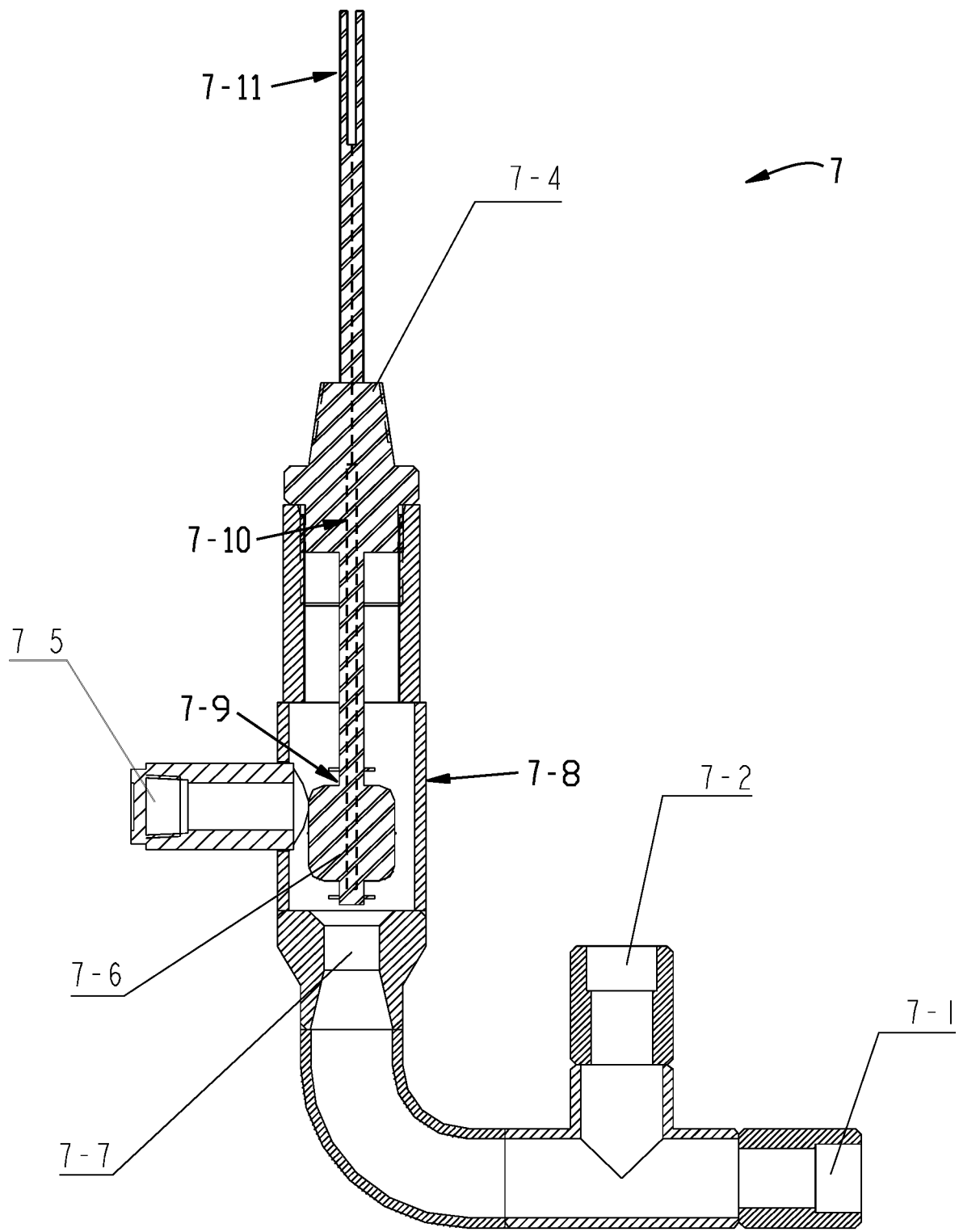
FIG. 4 schematically illustrates a further embodiment of the oil flow switch.

FIG. 4 illustrates a further embodiment of the oil flow switch 7 according to the present disclosure. Particularly, the float chamber 7-8 and other portions of the float device may be integrally formed into a single piece, wherein the float chamber 7-8 may be provided on one side of the oil pipeline of the float device, and the float chamber 7-8 may be communicated with the oil inlet 7-1 of the oil pipeline via the oil flow hole 7-7. The float switch base 7-4 may be fixedly mounted to the float chamber 7-8 for example through a threaded connection, and a sight glass 7-5 for observing a liquid level may be provided on one side of the float chamber 7-8. According to a preferred embodiment of the present disclosure, integration of the components may also be realized so that the float device 7 can be easily fitted to the circulating oil passage.

The present invention has been described through the embodiments above. However, it should be understood that the above-described embodiments are only for exemplary and illustrative purposes rather than any intention to limit the present disclosure within the scope of the described embodiments. Besides, those skilled in the art may understand that the present disclosure is not limited to the embodiments above, and more alterations and modifications may be made according to the teaching of the present disclosure, and these alterations and modifications all fall within the claimed scope of the present disclosure.

We claim:

1. An oil flow switch, comprising a float device connected to a circulating oil passage and a floating liquid level switch element provided in the float device, wherein:
   the float device comprises an oil inlet, an oil outlet disposed at a greater vertical height than the oil inlet, and a float chamber fluidly coupled between the oil inlet and the oil outlet,
   the floating liquid level switch element is disposed in the float chamber, and
   the float device comprises a channel that fluidly couples the oil outlet and the float chamber, and the channel is configured to discharge gas from the float chamber into the oil outlet.

2. The oil flow switch according to claim 1, wherein an oil flow hole is disposed at a bottom of the oil inlet of the float device to make the float chamber fill with oil via an impulse of oil flow or a local pressure drop caused by a change of flow direction of the oil flow.

3. The oil flow switch according to claim 1, wherein the floating liquid level switch element further comprises a float switch base fixedly coupled to the float chamber and a float movable relative to the float switch base with rise and fall of a liquid level in the float chamber.

4. The oil flow switch according to claim 3, wherein the float switch base is fixedly threaded in the float chamber, and the float switch base comprises a sleeve rod on which the float is strung.

5. The oil flow switch according to claim 3, wherein the float chamber comprises a sight glass for observing a liquid level and a working state of the float.

6. The oil flow switch according to claim 5, wherein the channel is aligned with the sight glass to enable observation of the liquid level and the working state of the float via the channel.

7. The oil flow switch according to claim 3, wherein the float switch base comprises a reed switch, and is configured to transmit a digital signal generated by the reed switch outward via a signal line on the float switch base.

8. The oil flow switch according to claim 1, wherein the float chamber, the oil inlet, and the oil outlet are integrally formed into a single piece.

9. The oil flow switch according to claim 1, wherein the oil inlet of the oil flow switch is coupled to an oil storage device of the circulating oil passage, and the oil flow switch is configured to determine a liquid level in the oil storage device.

10. A lubrication system, comprising:
    a lubrication circuit that includes an oil storage device and an oil flow switch, wherein the oil flow switch comprises:
    an oil inlet that is fluidly coupled to the oil storage device;
    an oil outlet that is fluidly coupled to the oil inlet and disposed at a greater vertical height than the oil inlet;
    a float chamber fluidly coupled to the oil inlet;
    a floating liquid level switch element disposed in the float chamber; and
    a channel fluidly coupling the oil outlet and the float chamber and configured to allow gas to be discharged from the float chamber.

11. The lubrication system of claim 10, wherein the oil inlet comprises an oil flow hole that fluidly couples the oil inlet to the float chamber.

12. The lubrication system of claim 11, wherein the float chamber is configured to be filled with lubricant from the oil storage device via the oil flow hole of the oil inlet in response to a local pressure drop of the lubricant caused by a change of flow direction of the lubricant between the oil inlet and the oil outlet.

13. The lubrication system of claim 11, wherein the float chamber is configured to be filled with lubricant from the oil storage device via the oil flow hole of the oil inlet in response to an impulse of the lubricant at the oil inlet.

14. A refrigeration system, comprising:
    a lubrication circuit that includes an oil storage device and an oil flow switch, wherein the oil flow switch comprises:
    a horizontal oil inlet that is fluidly coupled to an outlet of the oil storage device;
    a vertical oil outlet that is fluidly coupled to the horizontal oil inlet;
    a float chamber having an oil flow hole that fluidly couples the horizontal oil inlet to the float chamber, and wherein the float chamber is configured fill with lubricant from the oil storage device via the oil flow hole in response to a local pressure drop caused by a change of flow direction of the lubricant between the horizontal oil inlet and the vertical oil outlet;
    a floating liquid level switch element disposed in the float chamber; and
    a channel fluidly coupling the oil outlet and the float chamber, wherein the channel is configured to allow gas to be discharged from the float chamber.

15. The refrigeration system of claim 14, wherein the oil flow switch comprises an electrical switch configured to complete a circuit to transmit an electrical signal in response to a liquid level of the lubricant in the float chamber being below a predetermined threshold liquid level.

16. The refrigeration system of claim 15, wherein the refrigeration system comprises a compressor that is fluidly coupled downstream of the oil flow switch in the lubrication circuit and communicatively coupled to the oil flow switch, and wherein the compressor is configured to deactivate in response to the electrical signal.

17. The refrigeration system of claim 15, wherein the refrigeration system comprises an oil pump that is fluidly coupled downstream of the oil flow switch in the lubrication circuit and communicatively coupled to the oil flow switch, and wherein the oil pump is configured to deactivate in response to the electrical signal.

18. The refrigeration system of claim 14, wherein the horizontal oil inlet and the vertical oil outlet of the oil flow switch comprise an elbow of the lubrication circuit.

* * * * *